United States Patent Office 3,085,123
Patented Apr. 9, 1963

3,085,123
METHOD FOR PREPARING VAPOR-PHASE ISOMERIZATION CATALYST
John A. Ridgway, La Porte, Ind., and Buell O'Connor, Texas City, Tex., assignors to Standard Oil Company, Chicago, Ill., a corporation of Indiana
No Drawing. Original application Nov. 17, 1958, Ser. No. 774,085, now Patent No. 3,020,241, dated Feb. 6, 1962. Divided and this application May 22, 1961, Ser. No. 135,687
4 Claims. (Cl. 260—683.75)

The present invention relates to a method for preparing a vapor-phase isomerization catalyst and, more particularly, to a method for treating a chlorine-containing, platinum-alumina reforming catalyst so as to make it highly selective and effective for the vapor-phase isomerization of paraffins.

With the persistent rise in the octane number of motor fuels, petroleum refiners have rapidly expanded catalytic reforming with platinum catalyst to the point where available reforming feedstocks are being exhausted. As a result, refiners are now turning to other processes for octane improvement, a particularly attractive process being isomerization. In the isomerization process, light paraffins, such as normal pentane and normal hexane, are converted to isomers, having substantially higher octane numbers, e.g., isopentane, 2,2-dimethylbutane (neohexane), 2,3-dimethylbutane (diisopropyl), and the like.

Various isomerization processes and catalysts are available, but all of them suffer from one or more shortcomings such as highly-corrosive catalyst systems, relatively-low catalyst activity, catalyst regeneration difficulties, costly method of catalyst preparation, and the like. We have now discovered a method for preparing a highly-active isomerization catalyst which results in a process which is relatively free of such difficulties. Our advantageous method of catalyst preparation has the additional attribute of being able to convert a highly-active reforming catalyst to a catalyst which is highly selective and effective for paraffin isomerization. Thus the same catalyst plant can turn out both reforming catalyst and simultaneously, with the addition of a few preparation steps, a highly-active isomerization catalyst. These and other advantages of our invention will become apparent as the detailed description proceeds.

In accordance with the present invention a vapor-phase isomerization catalyst is prepared by the method which comprises impregnating solid, hydrous alumina containing between about 1 to 30 percent by weight of combined water in the presence of between about 0.001 to 0.02 mole of aluminum chloride per mole of dry $Al_2O_3$ with a solution of a platinum compound whereby platinum is added thereto in a proportion between about 0.01 and 2.0 percent by weight, based on dry $Al_2O_3$, drying and calcining, impregnating the resulting composite with hydrogen fluoride to a fluoride level in the range of about 0.5 to 5 percent by weight, based on dry $Al_2O_3$, exposing the composite to a substance selected from the group consisting of sulfur, sulfur-containing compounds, and mixtures thereof in sufficient quantity so that the catalyst is contacted with at least about 0.1 percent by weight of sulfur, based on dry $Al_2O_3$, and thereafter again calcining.

Prior to the above-described step of impregnating the platinum-alumina composite with hydrogen fluoride, the composite has been found to be a highly-active catalyst for hydroforming of virgin and cracked naphthas to high-octane levels. When the composite is then impregnated with hydrogen fluoride and sulfur treated as above described, the composite becomes highly selective for paraffin isomerization.

When preparing the catalytic composite, the source of platinum is preferably an aqueous solution of chloroplatinic acid. The platinum may be added simultaneously with aluminum chloride as an aqueous solution of chloroplatinic acid and aluminum chloride, or it may be added before or after the solid, hydrous alumina is contacted with aluminum chloride, preferably aqueous aluminum chloride. Prior to impregnating with hydrogen fluoride, the platinum-containing composite is dried, e.g., at 150 to 400° F. for 0.5 to 24 hours, and calcined, e.g., at 400 to 1200° F. for 0.5 to 24 hours. Hydrogen fluoride is then added, usually as aqueous hydrogen fluoride, in sufficient quantity so that the fluorine level of the resulting composite is in the range of about 0.5 to 5 percent by weight, based on dry $Al_2O_3$. The hydrogen-fluoride-impregnated composite is then exposed, before or after again being calcined, to contact with at least about 0.1 percent by weight of sulfur, e.g., about 0.1 to 5 percent by weight of sulfur. The exposure to sulfur may be in the vapor-phase or liquid-phase, preferably in the liquid-phase. In either case the contacted composite should then be calcined before being employed for isomerization.

When contacting the composite with sulfur in the liquid-phase, we prefer to use aqueous solutions of sulfur compounds, e.g., aqueous solutions of hydrogen sulfide, ammonium sulfide, and ammonium polysulfide. When contacting the composite with sulfur in the vapor-phase we may also use, in addition to hydrogen sulfide, ammonium sulfide, and ammonium polysulfide, other sulfur compounds such as mercaptans, carbon disulfide, and the like. As above mentioned, the catalyst should be recalcined prior to employing it for isomerization regardless of the method of sulfur treatment. For best results, we have found that the liquid-phase treatment, followed by recalcination, is much preferred. While the sulfur treating step exposes the catalyst to substantial sulfur levels, it should be understood that the subsequent calcination removes a substanital portion of the sulfur. The finished catalyst may thus contain only a fraction of the sulfur so added.

In accordance with the best mode contemplated, the present invention is carried out by first preparing a platinum-alumina composite, or obtaining a platinum-alumina composite already prepared, by impregnating solid, hydrous alumina containing 1 to 30 percent by weight of combined water in the presence of between about 0.001 to 0.02 mole of aqueous aluminum chloride per mole of dry $Al_2O_3$ with an aqueous solution of chloroplatinic acid whereby the platinum is added thereto in a proportion between 0.01 and 2 percent by weight, based on dry $Al_2O_3$. After drying and calcining, the composite is impregnated with aqueous hydrogen fluoride to a fluoride level of about 1.5 percent by weight, based on dry $Al_2O_3$. We again dry and calcine and thereafter expose the composite to an aqueous solution of ammonium sulfide in sufficient quantity so that the catalyst is contacted with about 0.9 percent by weight of sulfur, based on dry $Al_2O_3$, following which the catalyst is again dried and calcined.

The resulting composite has been found to be highly selective for isomerization of paraffins, particularly the isomerization of $C_4$ to $C_7$ paraffinic hydrocarbons. Effective conditions for isomerization of such hydrocarbons with our catalyst includes a temperature in the range of about 500 to 800° F., preferably 550 to 750° F.; a pressure of atmospheric or higher, e.g., atmospheric to 500 p.s.i., preferably 50 to 250 p.s.i.; a space velocity of about 0.1 to 10, preferably 0.5 to 5.0, optimally 1.5 to 3.0; and a hydrogen rate of about 100 to 10,000 standard cubic feet per barrel of hydrocarbon charge, preferably 500 to 5,000. The catalyst has the additional advantage of being readily regenerated by a simple carbon burnoff, e.g., by contacting with oxygen-containing gas at temperatures above about 600° F.

The present invention will be more clearly understood from the specific examples hereinafter set forth:

Example I

A platinum-alumina composite was prepared by gelling, drying and calcining a Heard-type alumina hydrosol (Heard Reissue No. 22,196, October 6, 1942) to a volatiles content of about 1 to 10 percent by weight, based on dry $Al_2O_3$, and thereafter impregnating the calcined alumina with an aqueous solution of chloroplatinic acid and aluminum chloride in sufficient quantities so that, after again drying and calcining, the resulting composite contained about 0.6 percent platinum and about 1.1 percent of chlorine. The resulting composite was found to be highly effective for the catalytic hydroforming, under well-known reforming conditions, of full-boiling-range naphthas, having CFR-R clear octane numbers in the range of about 35 to 70, to octane levels in excess of about 100.

The resulting composite was thereafter tested, both before and after treatment in accordance with the present invention, to determine its isomerization activity. In one experiment the composite was tested without any contact with hydrogen fluoride or sulfur. In a second experiment the composite was tested after being treated with aqueous hydrogen fluoride to a fluoride level of about 1.5 percent by weight, based on dry $Al_2O_3$, following which it was dried and calcined. In a third experiment the composite was tested after being contacted with an aqueous solution containing about 0.9 percent by weight, based on dry $Al_2O_3$, of sulfur in the form of ammonium sulfide, following which it was dried and calcined. In the fourth experiment, which illustrates the present invention, the composite was tested after being treated with an aqueous hydrogen fluoride solution to a fluoride level of about 1.5 percent by weight, based on dry $Al_2O_3$, following which it was dried and calcined and contacted with an aqueous solution containing 0.9 percent by weight, based on dry $Al_2O_3$, of sulfur in the form of ammonium sulfide and again dried and calcined.

Each of the above catalysts were tested under isomerization conditions including the particular temperatures which resulted in the maximum production of neohexane for that particular catalyst. Neohexane yield was used as one measure of activity since such component has a very high octane number and is a highly-desirable product from an isomerization process. At the same time, it is also highly desirable to minimize the cracking reactions so that charge stock, which is not isomerized, is not converted to gas, and thus unavailable for gasoline blending and/or possible recycle operation. Thus, maximum neohexane and minimum cracked product are both measures of a superior catalyst.

The isomerization activity tests were carried out utilizing a combined microreactor-gas chromatography assembly similar to units described by Emmett (Paul H. Emmett, Advances in Catalysis, vol. IX, pp. 645-648, 1957, Academic Press, Inc., Publishers, New York, N.Y.) and by Maréchal et al. (I. Maréchal, L. Convent, I. van Rysselberge, Revue de L'Institut Francais du Pétrole 12, 1067-1074, 1957). The reactor and chromatograph column were directly coupled and hydrogen carrier gas passed through them in series. In the operation of the unit, a small amount of charge, i.e., 2-methylpentane, was injected over a period of about 15 seconds. The injected material passed to the reactor and then to the chromatograph column-conductivity cell analyzer.

For each test the reactor was loaded with two milliliters of catalyst having a mesh size of 40-60 (ASTM Designation E11-39). For each test the charge stock was 2-methylpentane. The hydrogen carrier for the charge was added at the rate of 40 milliliters per minute, and the total charge volume for each test was 0.01 milliliter.

The chromatograph column had a diameter of ¼ inch and a length of 12 feet, and was operated at room temperature. The packing consisted of isoquinoline on fire brick.

The neohexane yield and cracked-product yield obtained when employing each catalyst was determined by measuring the chromatograph peak heights (in arbitrary units). The results are as follows:

| Pt-$Al_2O_3$ Catalyst | Yield as Measured by Chromatograph Peak Heights | |
| --- | --- | --- |
| | Cracked Prod. | Neohexane |
| Without added HF and S | >200 | 8 |
| With added HF | >200 | 16 |
| With added S | >200 | 9 |
| With added HF and S | 13 | 40 |

It is readily apparent from the above table that maximum neohexane yield and minimum cracked-product yield were obtained only when the catalyst was prepared in accordance with the method of the present invention.

Example II

Another series of tests were made using five catalysts, all of which were prepared in accordance with the method of the present invention. For each test the fluorine and/or sulfur treat level were varied. The same apparatus, the same charge stock, and approximately the same conditions as in Example I were employed. $C_3$ yield was used as a measure of undesired cracking and neohexane yield was used as the measure of isomerization activity. The results are as follows:

| Treating Level, Wt. Percent | | Yield as Measured by Chromatograph Peak Heights | | Temp., ° F. at Max. Neohexane Yield |
| --- | --- | --- | --- | --- |
| Fluorine | Sulfur | $C_3$ | Neohexane | |
| 1.5 | 0.9 | 3 | 39 | 605 |
| 3.0 | 1.8 | 20 | 38 | 625 |
| 3.0 | 3.6 | 5 | 39 | 599 |
| 4.5 | 1.8 | 37 | 36 | 626 |
| 4.5 | 3.6 | 17 | 36 | 599 |

It is apparent from the above tabulation that in all cases a highly active isomerization catalyst resulted. Optimum treating levels, as measured by minimum $C_3$ yield and maximum neohexane yield were a fluorine content of 1.5 percent by weight and a sulfur-exposure level of 0.9 percent by weight.

Example III

A series of twelve runs were made employing a hexane blend as the charge stock, instead of substantially pure 2-methylpentane as in Examples I and II above. The hexane blend consisted of a non-equilibrium blend of 2-methylpentane, 3-methylpentane, normal hexane, neohexane, and diisopropyl. The runs were made at varying temperatures with the hexane blend being charged either batch-wise or continuously. For the batch experiments the same apparatus as in Examples I and II was employed. When the hexane blend was charged continuously, the apparatus was modified so that the hydrogen stream was first charged to a saturator wherein it picked up the hexane charge continuously.

The catalyst was prepared in accordance with the method of the present invention as described in Example I, except that quantities of impregnating and treating materials were adjusted so that the finished catalyst had a platinum content of about 1.2 percent, a chloride content in excess of 2 percent, a fluoride content of about 2.5 percent, and a residual sulfur content corresponding to a sulfur-treat level of about 1.5 percent. The results are as follows:

| Number of Runs | Approximate Temperature, °F. | | Equilibrium Yield | |
|---|---|---|---|---|
| | Batch Charge | Continuous Charge | Neohexane | Diisopropyl |
| 2 | 605 | | Yes | Yes. |
| 2 | 640 | | Yes | Yes. |
| 1 | | 655 | Yes | Yes. |
| 2 | 680 | | Yes | Yes. |
| 1 | | 700 | Yes | Yes. |
| 2 | 720 | | Yes | Yes. |
| 1 | | 755 | Yes | Yes. |
| 1 | 760 | | Yes | Yes. |

As shown in the above tabulation, in all cases equilibrium yields of neohexane and diisopropyl were obtained. When the catalyst accumulates coke, it is readily regenerated by contact with flue gas containing about 2 percent oxygen at 700 to 1000° F.

It is readily apparent from the above description that the present invention provides a catalyst which is substantially noncorrosive, has a very high isomerization activity, can be readily regenerated, and is inexpensive to produce, particularly since it permits conversion of a reforming catalyst to an isomerization catalyst.

This application is a division of application Ser. No. 774,085, filed November 17, 1958, now Patent No. 3,020,241.

Having thus described the invention, what is claimed is:

1. A hydrocarbon conversion process for isomerizing light hydrocarbons which comprises contacting said hydrocarbons at isomerization conditions comprising temperatures in the range of about 500 to about 800° F., pressures in the range of about atmospheric and about 500 p.s.i.g., and between about 500 to 5,000 standard cubic feet of hydrogen per barrel of said hydrocarbons, with a catalyst prepared by impregnating solid hydrous alumina containing between about 1 to 30 percent by weight of combined water in the presence of between about 0.001 to 0.02 mole of aluminum chloride per mole of dry $Al_2O_3$ with a solution of a platinum compound whereby platinum is added thereto in a proportion between about 0.01 and 2.0 percent by weight, based on dry $Al_2O_3$, drying and calcining, impregnating the resulting composite with hydrogen fluoride to a fluoride level in the range of about 0.5 to 5 percent by weight, based on dry $Al_2O_3$, exposing the composite to a substance selected from the group consisting of sulfur, sulfur-containing compounds, and mixtures thereof, in sufficient quantity whereby said composite is contacted with at least about 0.1 percent by weight of sulfur, based on dry $Al_2O_3$, and calcining.

2. The process of claim 1 wherein said platinum compound is a water-soluble chloro-platinum compound.

3. The process of claim 1 wherein said substance is an ammonium sulfide.

4. An isomerization process which comprises contacting in the vapor phase paraffinic hydrocarbons containing from about 4 to about 7 carbon atoms per molecule with a catalyst at isomerization conditions comprising a temperature in the range of about 500 to about 800° F., a pressure in the range of between about atmospheric and about 500 p.s.i.g., and between about 500 to 5,000 standard cubic feet of hydrogen per barrel of said hydrocarbons, said catalyst being prepared by the method which comprises impregnating calcined alumina containing between about 1 to about 10 percent by weight of combined water with an aqueous solution of chloroplatinic acid and aluminum chloride, drying and calcining the impregnated alumina, said solution being used in sufficient quantity whereby after said impregnating, drying and calcining the resulting composite contains about 0.6 weight percent platinum and about 1.1 weight percent chlorine, based on dry $Al_2O_3$, treating said composite with an aqueous solution of hydrogen fluoride whereby fluoride is added to said composite in an amount of about 1.5 weight percent, based on dry $Al_2O_3$, drying and calcining the resulting fluoride-containing composite, treating said fluoride-containing composite with an aqueous solution of ammonium sulfide containing about 0.9 percent by weight of sulfur, based on dry $Al_2O_3$, and drying and calcining.

No references cited.